United States Patent [19]
Habiger

[11] 3,890,788
[45] June 24, 1975

[54] HYDROSTATIC DRIVE SYSTEM

[75] Inventor: Cyril W. Habiger, Joliet, Ill.

[73] Assignee: Caterpillar Tractor Company, Peoria, Ill.

[22] Filed: Apr. 24, 1974

[21] Appl. No.: 463,443

[52] U.S. Cl. .................................. 60/468; 60/494
[51] Int. Cl. ........................................ F15b 15/18
[58] Field of Search .......... 60/464, 468, 469, 487, 60/494

[56] References Cited
UNITED STATES PATENTS

| | | | |
|---|---|---|---|
| 2,058,894 | 10/1936 | Link | 60/468 |
| 3,456,442 | 7/1969 | Brooks | 60/468 X |
| 3,672,168 | 6/1972 | Salmon | 60/494 X |

Primary Examiner—Edgar W. Geoghegan
Attorney, Agent, or Firm—Ralph E. Walters

[57] ABSTRACT

A hydrostatic drive system for a vehicle providing precise slow speed control of vehicle movement including a closed hydraulic system interconnecting a variable displacement pump and a hydraulic motor, and a pressure responsive automatically variable restrictor valve which is disposed within the hydraulic system and normally open for permitting fluid flow therethrough for dampening pressure surges in the hydraulic system with the valve being responsive to fluid pressure generated in the hydraulic system progressively to reduce and eventually to block fluid flow through the restrictor valve when the fluid pressure increases above a predetermined value.

7 Claims, 1 Drawing Figure

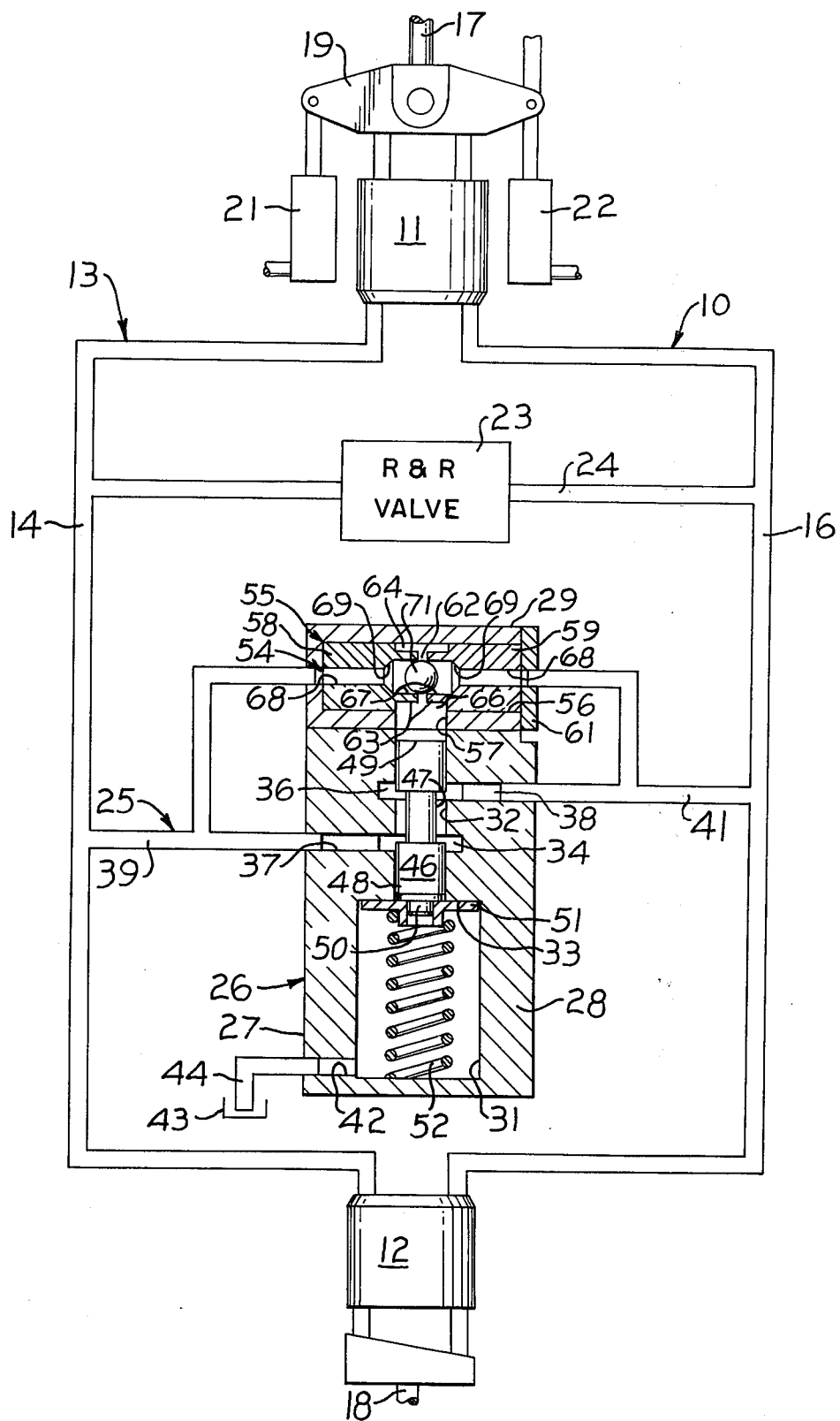

HYDROSTATIC DRIVE SYSTEM

BACKGROUND OF THE INVENTION

Hydrostatic transmissions are employed for propelling a wide variety of vehicles including farm tractors, earth-moving crawler tractors, and lift trucks. Generally, the transmission has a variable displacement overcenter pump driven by the engine and a hydraulic motor operatively connected to the drive wheels or tracks either directly or through suitable gearing. The pump and motor are interconnected in a closed hydraulic loop such that the pump transmits pressurized fluid to the motor and the fluid exhausted from the motor is transmitted back to the pump intake. Although the basic hydraulic transmission is essentially the same for all types of vehicles, the controls therefor are necessarily different to compensate for the operating characteristics of a particular type of vehicle. For example, lift trucks frequently are required to operate in tight quarters and move smoothly and slowly with the engine running at high rpm's to maintain high fluid pressures in the lift circuit. The basic closed loop hydraulic transmission has abrupt pressure changes and fluid surges in the loop as the pump moves away from zero displacement and does not provide the necessary modulation at low pump output to satisfy these requirements, particularly when resistance to vehicle movement is relatively low.

Some such lift trucks incorporate a valve in the transmission hydraulic circuit to bypass fluid from the pump discharge to the intake at low speeds or small pump displacements. An example of such valve is disclosed in the Grant U.S. Pat. No. 3,451,218 assigned to the assignee of the present invention. However, the valve opening flow area is a function of pump displacement and is open regardless of the discharge fluid pressure level. This causes a reduction of transmission efficiency at low speeds requiring high fluid pressure and thereby reduces maximum rim pull of the vehicle. This occurs when the vehicle is heavily loaded or high resistance to movement is encountered such as traversing steep grades, ramps and the like.

OBJECTS OF THE INVENTION

Accordingly, an object of this invention is to provide an improved hydrostatic drive system for a vehicle which provides precise, slow speed control of vehicular movement when resistance to movement is relatively low.

Another object of this invention is to provide such an improved hydrostatic drive system which is capable of operating at maximum efficiency even when encountering increases in resistance to vehicular movement during traversment of grades and the like.

Other objects and advantages of the present invention will become more readily apparent upon reference to the accompanying drawing and following description.

BRIEF DESCRIPTION OF THE DRAWING

The sole FIGURE is a schematic drawing with valve portions thereof shown in section depicting a hydrostatic drive system embodying the principles of the present invention.

DESCRIPTION OF THE PREFERRED EMBODIMENT

Referring more particularly to the drawing, a hydrostatic drive system embodying the principles of the present invention is generally indicated by the reference numeral 10 and adapted for propelling a lift truck, not shown. The hydrostatic drive system includes a variable displacement overcenter pump 11 which is hydraulically connected to a hydraulic motor 12 through a closed loop hydraulic system 13 which includes a pair of motor conduits 14 and 16. The pump has an input shaft 17 commonly connected to an engine, not shown, while the motor has an output shaft 18. A pivotal swash plate 19 of the pump is controlled by a pair of actuating cylinders 21 and 22 in the usual manner such that actuation of the cylinder 22 changes the angle of the swash plate to pump fluid through the conduit 14 to drive the motor in a forward direction while fluid exhausted from the motor is transmitted through the conduit 16 to the pump intake. Conversely, actuating the cylinder 21 causes fluid to be pumped through the conduit 16 to drive the motor in a reverse direction. A replenishing and relief valve 23 is interposed in a conduit 24 extending between the motor conduits to replenish fluid lost in the hydraulic system due to leakage and to limit maximum pressure in the hydraulic system in the usual manner.

A fluid bypass circuit 25 is interconnected between the motor conduits 14 and 16 in parallel with the motor 12 and includes a restrictor and shut-off valve 26 having a composite valve body 27 formed by a pair of body members 28 and 29. A pair of concentric bores 31 and 32 are formed in the member with the bore 31 terminating at a shoulder 33. A pair of axially spaced annuli 34 and 36 are formed in the bore 31. A pair of ports 37 and 38 are formed in the member 28 in communication with the annuli 34 and 36, respectively. The port 37 communicates with the motor conduit 14 through a line 39 while the port 38 communicates with the motor conduit 16 through a line 41. A drain passage 42 is formed in the body member 28 and connects the bore 31 with a tank 43 through a drain line 44.

A valve spool 46 is slidably disposed in the bore 32 and has an annular groove 47 formed therein intermediate its ends 48 and 49. A reduced diameter portion 50 is formed on the end 48 and is suitably secured to a spring seat plate 51 disposed in the bore 31. A spring 52 is disposed in the bore 31 and resiliently urges the plate into abutment with the shoulder, thereby positioning the valve spool in an open position such that the annular groove establishes restricted communication between the annuli.

An auxiliary flow path 54 connects the lines 39 and 41 with the end 49 of the valve spool 46 and includes a shuttle check valve generally indicated by the reference numeral 55 housed in the body member 29. A bore 56 is formed in the member 29 and is disposed normal to a bore 57 which is concentric with and opens into the bore 32 of the member 28. A pair of inserts 58 and 59 are fitted in the bore 56 and are retained therein by a cover 61 suitably secured to the member 29. A space 62 is provided between the inner ends of the inserts, each of which has a reduced diameter portion 63 formed thereon defining an annulus 64 which communicates the space with an actuating chamber 66 formed adjacent to the end 49 of the valve spool 46. A bore 67 extends outwardly from the inner end of each insert and connects with a smaller co-axial passage 68 forming a valve seat 69 therebetween. The lines 39 and 41 communicate with the passages 68 of the inserts 58 and 59, respectively. A ball valve 71 is loosely contained in the bores 67 of the inserts.

OPERATION

While the operation of the present invention is believed clearly apparent from the foregoing description, further amplification will subsequently be made in the following brief summary of such operation. The speed of the output shaft 18 of the hydraulic motor 12 in either direction is determined by the volumetric output of the pump 11, with the pump output being controlled by the angle of the swash plate 19 and/or the engine speed. Thus, increasing the fluid flow through the conduit 14 increases the speed of the hydraulic motor in the forward direction while increasing the fluid flow through the conduit 16 increases the reverse speed of the hydraulic motor.

When the swash plate is moved from its zero displacement position by actuating the forward actuating cylinder 22, the initial fluid output of the pump 11 is transmitted through the conduit 14 to the hydraulic motor 12. At the same time the fluid bypass circuit 25 directs a portion of the pump output back to the pump intake through conduit 16 to dampen initial pressure surges and shocks in conduit 14 and to smooth fluid flow to the motor. The fluid flow through the restrictor valve of the bypass circuit passes through the port 37, annulus 34, the space existing between the bore 31 and the annular groove 47 and through the restricted opening existing through the port 38. The restriction to fluid flow through the valve generates a pressure rise in the line 39 and conduit 14, with such pressure rise being transmitted to the hydraulic motor to cause it to rotate in the forward direction at a rate initially only barely overcoming the vehicle's resistance to movement in a precisely controlled manner for improved inching and slow speed maneuverability of the vehicle.

The pressurized fluid in the line 39 is also communicated through the auxilliary flow path 54 to the chamber 66. More specifically the fluid passes through the passage 68 of the insert 58 and forces the ball 71 of the shuttle check valve 55 against the valve seat 69 of the insert 59 to block fluid flow through the passage 68 of the insert 59. The fluid is transmitted through the space 62 and into the chamber 66 where it exerts a force on the valve spool 46, urging it against the bias of the spring 52. Initially, such force is not sufficient to move the spool against the force exerted by the spring.

However, as the swash plate angle is increased by manual manipulation of the controls by the operator to increase the vehicle speed, the fluid flow through the conduit 14 and line 39 increases accordingly. Since the valve spool 46 is restricting the flow of fluid through the restrictor valve 26, the fluid pressure in the line 39 and conduit 14 increases in proportion to the fluid flow rate. The increase in fluid pressure generated in the line 39 and thus the chamber 66 creates sufficient force on the valve spool to overcome the spring force such that the spool is moved downwardly in proportion to the fluid pressure progressively to decrease the area of the opening spool and the annulus 36 increasing the resistance to fluid flow therethrough. At a predetermined flow rate and pressure value, the valve spool will completely block fluid flow through the restrictor valve. At this point, the transmission drive system functions at its maximum efficiency for attaining higher vehicle speeds. At flow rates below the predetermined flow rate, the restrictor valve meters the flow through the bypass circuit for precise smooth slow speed maneuvering of the vehicle.

Once fluid flow through the restrictor valve 26 is blocked due to pressure rise in the line 39, the valve will remain blocked so long as the fluid pressure required to drive the hydraulic motor 12 remains above the predetermined pressure required to hold the valve spool 46 in the closed position against the force of the spring 52. For example, in many instances, it is desirable to reduce the speed of the vehicle to a relatively slow speed when the vehicle is heavily loaded and is negotiating a steep grade or loading ramp. Under these conditions, the fluid pressure in the conduit 14 required to drive the hydraulic motor remains above the predetermined pressure value noted above. Thus, even though the volume of pump output flow may be reduced to below the predetermined flow rate, the restrictor valve will remain closed so that the efficiency of the hydrostatic drive system is maintained.

During reverse operation of the transmission drive system, the fluid flow through the restrictor valve 26 is reversed since the output of the pump 11 is transmitted through the conduit 16 while the conduit 14 serves as the intake to the pump. However, the operation of the restrictor valve is essentially the same as previously described, with the exception that the valve spool 46 is responsive to fluid pressure in the line 41. Also, the ball 71 of the shuttle check valve 55 is responsive to the pressurized fluid in the line 41 and automatically shifts against the valve seat 69 of the insert 58 to block communication through the passage 68 of the insert 58 to the line 39.

In view of the foregoing, it is readily apparent that the structure of the present invention provides an improved hydrostatic drive system which shunts a portion of the pump output through an automatically variable restriction to the pump intake when the output flow rate and pressure are relatively low thereby dampening pressure surges and smoothing fluid flow transmitted to the drive motor in a precisely controlled manner for improved inching and slow speed maneuverability of the vehicle. The variable restriction is responsive to fluid pressure in the system automatically to decrease, and eventually to block, fluid flow therethrough as the pressure value in the system reaches a predetermined value for maximum utilization of the pump output during high speed vehicle operation while being effective to accommodate any encountered increases in resistance to vehicle movement without any sacrifice of drive efficiency by maintaining sufficient pressure in the system to hold the bypass valve closed even though the output flow from the pump momentarily drops below the above designated predetermined rate.

While the invention has been described and shown with particular reference to the preferred embodiment, it will be apparent that variations might be possible that would fall within the scope of the present invention, which is not intended to be limited except as defined in the following claims.

What is claimed is:

1. A hydrostatic drive system for a vehicle providing precise slow speed control of vehicle movement comprising:
- a variable displacement pump;
- a hydraulic motor;
- a closed hydraulic system interconnecting said pump and said motor for communicating fluid therebetween;
- fluid bypass means disposed within said hydraulic system in parallel with said motor including a pressure responsive automatically variable restrictor valve having a passage extending therethrough, a valve member operatively associated with said passage and a spring resiliently urging said valve member to an open position permitting fluid flow through the bypass means for dampening pressure surges and smoothing fluid flow in the hydraulic system at relatively slow vehicle speeds when the fluid flow in the hydraulic system is below a predetermined flow rate and a predetermined pressure value, said restrictor valve being effective to increase the fluid pressure in the closed hydraulic system as the fluid flow through the bypass means increases and responsive to such increased pressure progressively to reduce fluid flow through the bypass means for increasing the speed of the vehicle, and eventually to block such fluid flow through the bypass means when the fluid pressure exceeds said predetermined value to assure delivery of all fluid flow from the pump to the motor at high speeds and at high vehicle load conditions where the fluid pressure remains above said predetermined pressure even though the flow rate decreases below the predetermined rate at which said restrictor valve is normally opened; and
- said restrictor valve including means providing an auxiliary flow path for transmitting fluid under pressure from said closed hydraulic system to said valve member for moving it toward a closed position against the bias of said spring for blocking fluid flow through said passage when the fluid pressure in the hydraulic system exceeds said predetermined value.

2. The hydrostatic drive system of claim 1 wherein said passage means includes a bore formed in said valve and a pair of ports individually communicating said bore with said closed hydraulic system.

3. The hydrostatic drive system of claim 2 wherein said valve member is a valve spool slidably disposed in said bore and having an annular groove formed therein, said valve spool forming an actuating chamber in said bore in communication with said auxiliary flow path.

4. The hydrostatic drive system of claim 3 wherein said closed hydraulic system includes a pair of conduits individually interconnecting said pump and said motor, said pump being an overcenter reversible flow pump for selectively transmitting fluid through one of the conduits.

5. The hydrostatic drive system of claim 4 wherein said auxiliary flow path communicates with both of said conduits, and shuttle check valve means disposed in said auxiliary flow path being responsive to fluid pressure in said one of said conduits to block fluid flow through said auxiliary flow path to the other of said conduits.

6. A hydrostatic drive system for a vehicle providing precise slow speed control of vehicle movement comprising:
- a variable displacement pump;
- a hydraulic motor;
- a closed hydraulic system including a pair of conduits individually interconnecting said pump and motor for transmitting pressurized fluid from said pump to said motor and returning fluid exhausted from said motor to said pump;
- bypass conduit means interconnecting said pair of conduits in parallel to said motor;
- a restrictor valve disposed in said conduit having a valve member and a spring resiliently urging said valve member to an open position to permit fluid flow therethrough for dampening pressure surges and smoothing fluid flow in the hydraulic system at relatively slow vehicle speeds when the fluid flow in the hydraulic system is below a predetermined flow rate and a predetermined pressure value, said valve member being operative in combination with said motor to increase the fluid pressure in the closed hydraulic system as the fluid flow through the bypass conduit means increases; and
- pressure responsive means operatively associated with said valve member of said restrictor valve in fluid communication with the closed hydraulic system and responsive to said increased pressure for progressively reducing fluid flow through the bypass conduit means so that the speed of the vehicle increases, and eventually completely blocking fluid flow through the bypass conduit means when the fluid pressure exceeds said predetermined value to assure delivery of all fluid flow from the pump to the motor at high speeds and at high vehicle load conditions where the fluid pressure remains above said predetermined pressure even though the flow rate decreases below the predetermined rate at which said restrictor valve is normally opened.

7. The hydrostatic drive system of claim 6 wherein said pressure responsive means includes means providing an auxiliary flow path for transmitting fluid under pressure from said closed hydraulic system to said valve member for moving it toward a closed position against the bias of said spring.

* * * * *

UNITED STATES PATENT OFFICE
CERTIFICATE OF CORRECTION

PATENT NO. : 3,890,788
DATED : June 24, 1975
INVENTOR(S) : Cyril W. Habiger

It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-first Day of October 1975

[SEAL]

Attest:

RUTH C. MASON
*Attesting Officer*

C. MARSHALL DANN
*Commissioner of Patents and Trademarks*